(12) United States Patent
Todd et al.

(10) Patent No.: US 11,294,734 B2
(45) Date of Patent: Apr. 5, 2022

(54) METHOD AND SYSTEM OPTIMIZING THE USE OF SUB-DATA CONFIDENCE FABRICS

(71) Applicant: EMC IP Holding Company LLC, Hopkinton, MA (US)

(72) Inventors: Stephen James Todd, North Conway, NH (US); Jason A. Shepherd, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 333 days.

(21) Appl. No.: 16/665,690

(22) Filed: Oct. 28, 2019

(65) Prior Publication Data

US 2021/0034435 A1 Feb. 4, 2021

Related U.S. Application Data

(63) Continuation-in-part of application No. 16/529,743, filed on Aug. 1, 2019, now Pat. No. 10,812,326.

(51) Int. Cl.
| | |
|---|---|
| *G06F 9/50* | (2006.01) |
| *G06F 9/54* | (2006.01) |
| *G06F 9/38* | (2018.01) |
| *G06F 11/30* | (2006.01) |
| *G06F 9/445* | (2018.01) |

(52) U.S. Cl.
CPC .......... *G06F 9/5083* (2013.01); *G06F 9/3869* (2013.01); *G06F 9/44505* (2013.01); *G06F 9/544* (2013.01); *G06F 11/3006* (2013.01); *G06F 2209/503* (2013.01)

(58) Field of Classification Search
CPC . H04L 41/0813; H04L 9/0643; H04L 9/3247; H04L 67/42; H04L 67/12; H04L 41/0893; H04L 2209/38; G06F 9/5083; G06F 9/3869; G06F 9/44505; G06F 9/544; G06F 11/3006; G06F 2209/503
See application file for complete search history.

(56) References Cited

U.S. PATENT DOCUMENTS

| | | |
|---|---|---|
| 8,474,032 B2 | 6/2013 | Fetik |
| 8,959,070 B2 | 2/2015 | Elbaz |
| 2005/0257045 A1 | 11/2005 | Bushman |
| 2005/0277403 A1 | 12/2005 | Schmidt |
| 2015/0356494 A1 | 12/2015 | Kolesnikov |
| 2015/0363109 A1 | 12/2015 | Frick |
| 2020/0120023 A1 | 4/2020 | Munson et al. |
| 2020/0244701 A1 | 7/2020 | Di Domenico et al. |
| 2020/0274713 A1 | 8/2020 | Li |
| 2021/0224093 A1 | 7/2021 | Fu et al. |

*Primary Examiner* — Brian Whipple
(74) *Attorney, Agent, or Firm* — Chamberlain, Hrdlicka, White, Williams & Aughtry

(57) ABSTRACT

In general, in one aspect, the invention relates to a method for managing data, the method includes obtaining, by a data management system, a first resource usage of a local data system associated with a first data confidence fabric (DCF) pipeline, wherein the first DCF pipeline is associated with a first workload, obtaining second resource usage of the local data system associated with a second DCF pipeline, wherein the second DCF pipeline is associated with a second workload, analyzing the first resource usage and the second resource usage to obtain a workload ranking, and performing an action set based on the workload ranking.

20 Claims, 11 Drawing Sheets

METHOD AND SYSTEM OPTIMIZING THE USE OF SUB-DATA CONFIDENCE FABRICS

CROSS-REFERENCE TO RELATED APPLICATIONS

This application is a continuation-in-part application of U.S. patent application Ser. No. 16/529,743 filed on Aug. 1, 2019. U.S. patent application Ser. No. 16/529,743 is hereby incorporated by reference in its entirety.

BACKGROUND

Systems may be configured to obtain information from multiple devices. Traditional approaches to configuring such systems require manual configuration and manual updating as devices from which the system is receiving information change.

SUMMARY

In general, in one aspect, the invention relates to a method for managing data, the method comprising: obtaining, by a data management system, a first resource usage of a local data system associated with a first data confidence fabric (DCF) pipeline, wherein the first DCF pipeline is associated with a first workload, obtaining second resource usage of the local data system associated with a second DCF pipeline, wherein the second DCF pipeline is associated with a second workload, analyzing the first resource usage and the second resource usage to obtain a workload ranking, and performing an action set based on the workload ranking.

In general, in one aspect, the invention relates to a non-transitory computer readable medium comprising computer readable program code, which when executed by a computer processor enables the computer processor to perform a method, the method comprising obtaining, by a data management system, a first resource usage of a local data system associated with a first data confidence fabric (DCF) pipeline, wherein the first DCF pipeline is associated with a first workload; obtaining second resource usage of the local data system associated with a second DCF pipeline, wherein the second DCF pipeline is associated with a second workload; analyzing the first resource usage and the second resource usage to obtain a workload ranking; and performing an action set based on the workload ranking.

In general, in one aspect, the invention relates to a system, comprising a processor, memory comprising instructions, which when executed by the processor, perform a method, the method comprising obtaining first resource usage of a local data system associated with a first data confidence fabric (DCF) pipeline, wherein the first DCF pipeline is associated with a first workload, obtaining second resource usage of the local data system associated with a second DCF pipeline, wherein the second DCF pipeline is associated with a second workload, analyzing the first resource usage and the second resource usage to obtain a workload ranking, and performing an action set based on the workload ranking.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
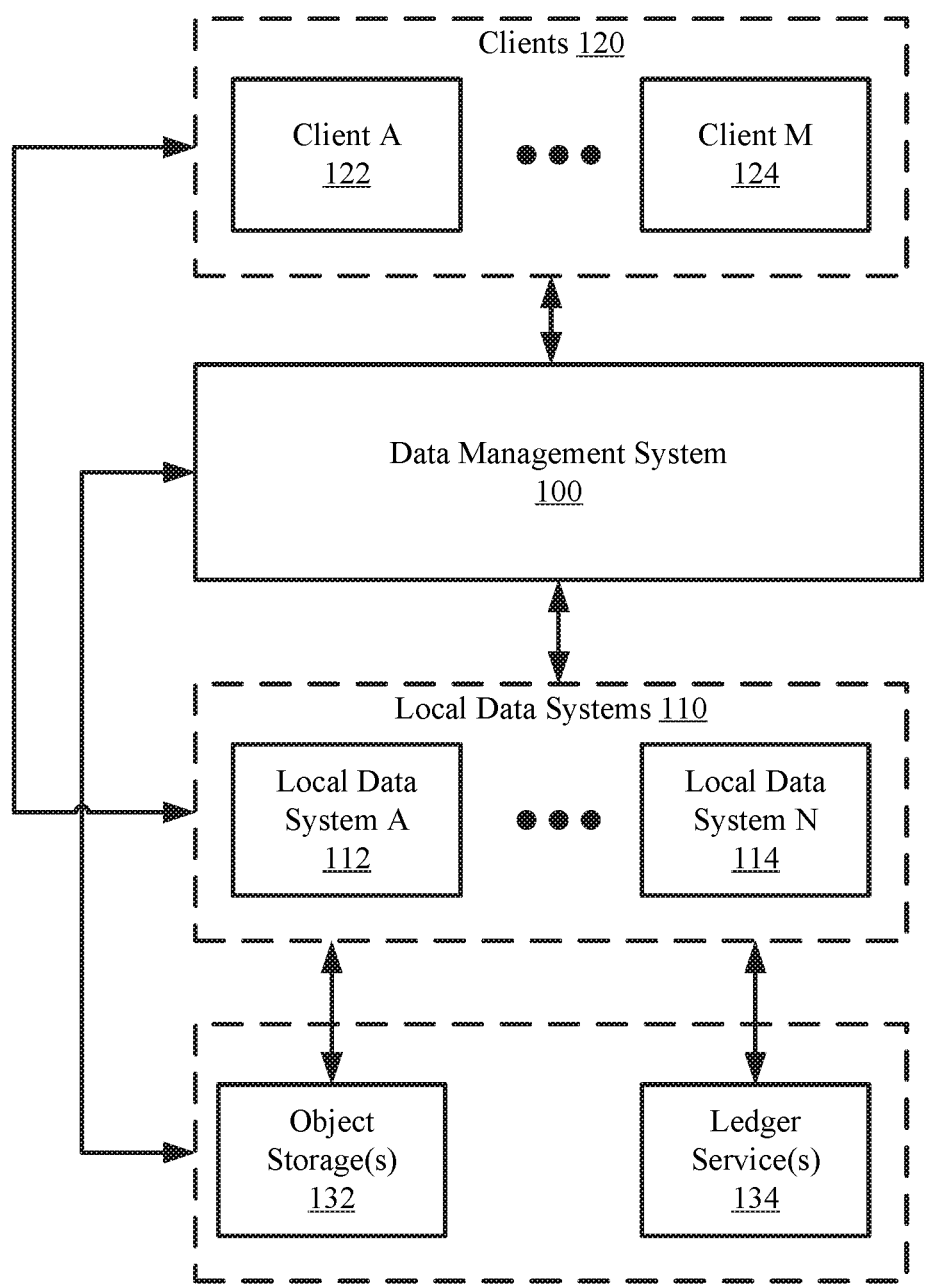
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing local data systems. More specifically, embodiments of the invention include using a data management system to obtain configuration requirements from workloads to configure the local data system. The data management system may generate a data confidence fabric (DCF) configuration file and deploy the DCF configuration file to one or more corresponding local data systems.

Further, embodiments of the invention include functionality for configuring local data system managers of the corresponding local data systems in accordance with the obtained DCF configuration file and to process the subsequently received data in accordance with the DCF configuration file.

Further, embodiments of the invention include functionality for configuring the local data systems to create sub-DCFs within a DCF. A sub-DCF corresponds to a partition (or portion) of DCF for a specific workload (or set of workloads). The sub-DCF may be configured in a manner that isolates the data stored in the sub-DCF from workloads that are not associated with the sub-DCF. In this manner, a single local data system may use a common set of hardware and software to logically partition the DCF implemented by the local data system into multiple sub-DCFs. Thus, from the point of view of the workloads, they are operating on their own DCF (which is a sub-DCF).

The use of sub-DCFs enables the local data system to process data from the same local data source differently for different workloads. Further, by using sub-DCFs, the local data system (or the data management system) is able to select and/or control, on a per-workload basis, which local data sources are accessible to a given workload. This allows for the local data system (or the data management system) to mask (or otherwise hide) the existence of local data sources from particular workloads. Thus, a single local data system may: (i) obtain data from multiple local data sources; (ii) selectively make available only certain local data sources to certain workloads; (iii) hide (or isolate) how each workload is requesting data to be processed by the local data system; and (iv) only allow workloads to access data associated with their specific sub-DCF.

Moreover, by coupling a workload to a given sub-DCF, the local data system may collect information about resource usage on a per-sub-DCF basis. This information may then be used to optimize the resource usage of the local data systems across the sub-DCFs. Further, if the local data systems are charging workloads (or legal entities associated with the workloads) for use of the resources of the local data systems, then the aforementioned charges may be determined based on, for example, the per-sub-DCF resource usage.

FIG. 1A shows a diagram of a system in accordance with one or more embodiments of the invention. The system includes a data management system (100), local data systems (110), clients (120), an object storage (132), and a ledger service (134). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the data management system (100) manages a data confidence fabric. In one or more embodiments of the invention, a data confidence fabric (DCF) is a logical grouping of computing devices configured to store data and provide data to clients (120). In one or more embodiments of the invention, the local data systems (110) are part of the DCF. As discussed above, the DCF may be partitioned into sub-DCFs. The sub-DCFs may be implemented on a per-local data system basis using, e.g., the DCF pipeline registry (described below) and the data ingestion manager (described below).

In one or more embodiments of the invention, the data management system (100) manages the DCF (including the sub-DCFs) by configuring computing devices associated with the DCF to store data and/or provide data in a way that is requested by the workloads executing on the clients (120), workloads executing on the local data systems (110), and/or workloads executing on other computing devices or components of the system. The data management system (100) may communicate with the workloads by providing the workloads a set of options for configuring the DCF computing devices (e.g., the local data systems (110)). The data management system may be further equipped to deploy configurations based on a selection of configuration options selected by the workloads. For additional details regarding the configuration management of the data management system (100), see, e.g., FIG. 2A.

In one embodiment of the invention, a workload is an entity that requests the processing of data obtained by a local data system using a DCF pipeline (described below). The workload may be an application executing on a client, an application executing on a local data system, an application executing on the data management system, an application executing on any other computing device in the system, and a user (via the client or other computing device).

Figure 4:
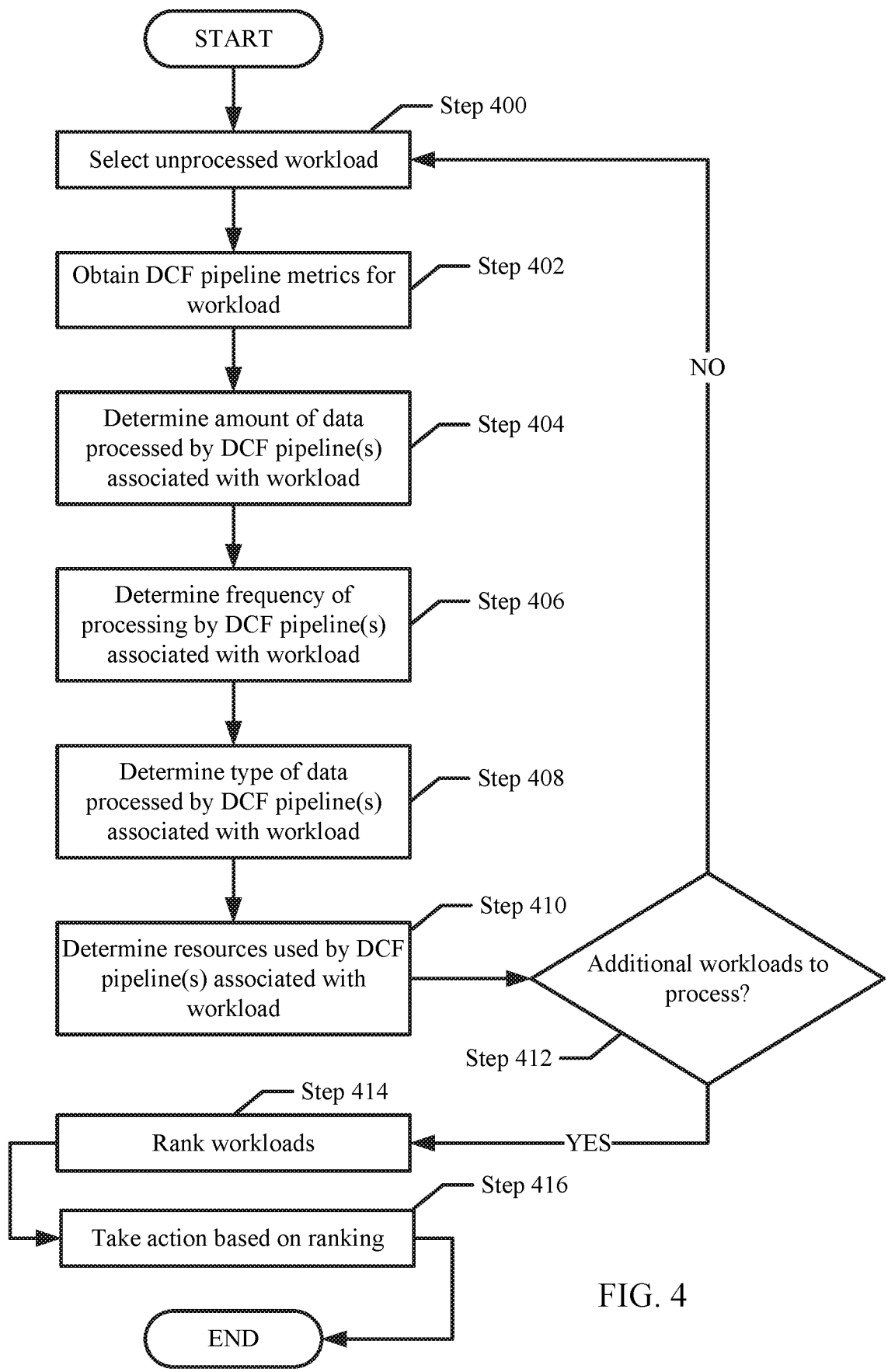
FIG. 4 shows a flowchart for managing a DCF in accordance with one or more embodiments of the invention.
Figure 5:
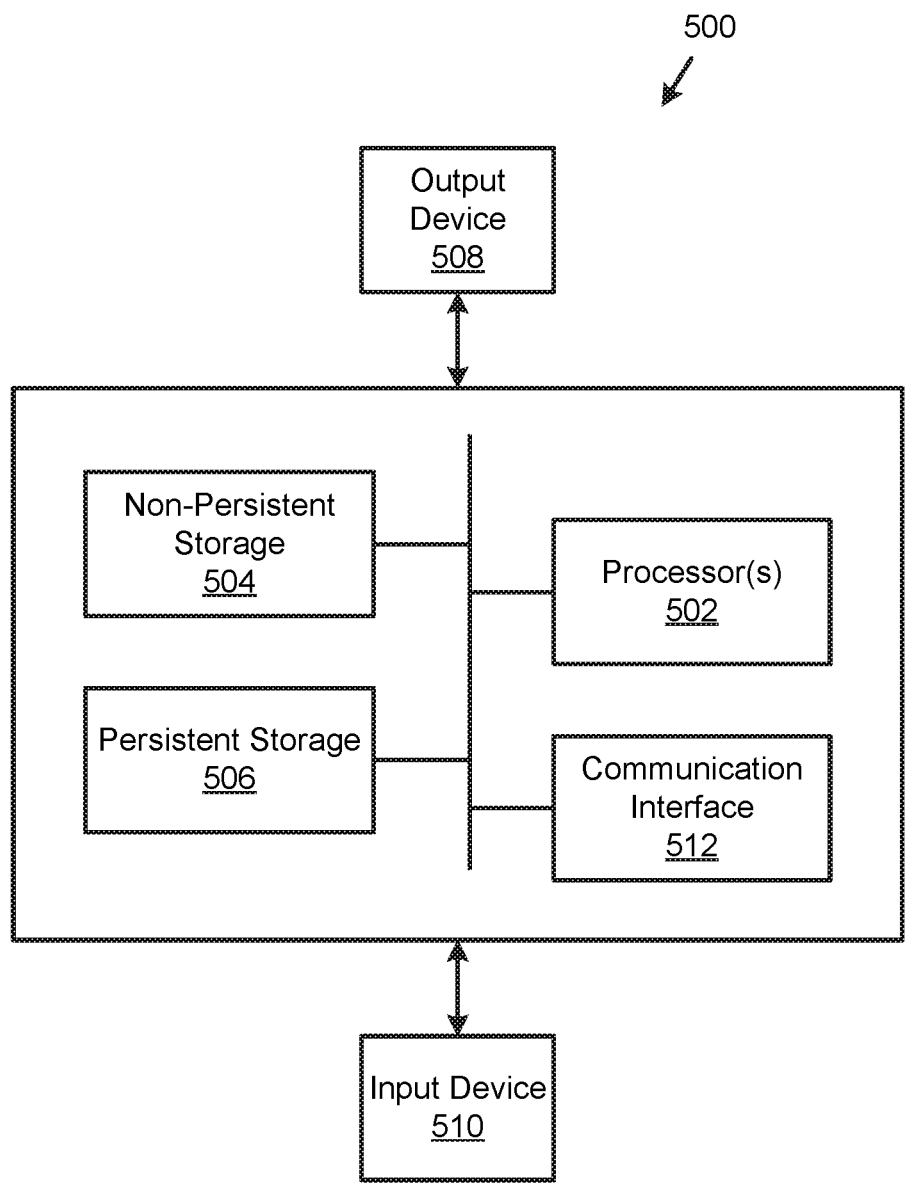
FIG. 5 shows a diagram of a computing device in accordance with one or more embodiments of the invention.

In one or more embodiments of the invention, the data management system (100) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the methods illustrated in FIGS. 2A and 4.

The data management system (100) may be implemented as a logical device without departing from the invention. The logical device utilizes computing resources of any number of physical computing devices to provide the functionality of the data management system (100) described throughout this application and/or all, or portion, of the methods illustrated in FIGS. 2A and 4. For additional details regarding the data management system, see, e.g., FIG. 1B.

In one or more embodiments of the invention, the local data systems (110) are systems associated with a data confidence fabric that obtains data, stores data, provides data, isolates data, and/or execute applications based on the stored data. The local data systems (110) may provide the stored data and/or applications to the workloads as specified by terms agreed to by the workloads based on transactions between the workloads and the local data systems (110).

In one or more embodiments of the invention, computing devices executing within the local data systems (110) may be associated with the DCF. In this manner, the data management system (100) may include functionality to configure one or more computing devices of the local data systems (110).

In one or more embodiments of the invention, each local data system (110) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (110) described throughout this application and/or all, or portion, of the method illustrated in FIGS. 2B-2C and 4.

A local data system (112, 114) may be implemented as a logical device without departing from the invention. The logical device utilizes computing resources of any number of physical computing devices to provide the functionality of the local data system (112, 114) described throughout this application and/or all, or portion, of the method illustrated in FIGS. 2B-2C and 4. For additional details regarding a local data system (112, 114), see, e.g., FIG. 1C.

In one or more embodiments of the invention, the clients (120), via workloads executing thereon, may utilize computing resources and/or access data of the local data systems (110). The workloads executing on the clients (120) may further communicate with the data management system (100) to select configuration options for configuring computing devices of the local data systems (110) and provide the options to the data management system (100).

In one or more embodiments of the invention, each client (122, 124) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, an object storage (132) is a service that stores data and, optionally, metadata obtained from the local data systems (110). The object storage (132) may be equipped to store immutable entries (i.e., entries that cannot be modified or deleted), where each entry includes an object data identifier of the data and/or additional metadata of the data. The object data identifier (OID) may be a unique identifier generated by performing a function (e.g., a hash function) on an obtained data set (or a portion thereof) to obtain a unique value (i.e., the object data identifier). The object storage (132) may be internal or external to a local data system (112, 114) without departing from the invention.

In one or more embodiments of the invention, the additional metadata of an entry may specify additional information about a data set such as, for example, an owner of the data set (e.g., specified using a decentralized identifier (DID)), a geographical location of the data set, and/or other information associated with the data set without departing from the invention.

In one or more embodiments of the invention, the object storage (132) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the object storage (132) described throughout this application.

In one or more embodiments of the invention, the object storage (132) is implemented as a logical device. The logical device may utilize computing resources of any number of physical computing devices to provide the functionality of the object storage (132) described throughout this application.

In one or more embodiments of the invention, a ledger service (134) is a service that stores data and/or metadata obtained from the local data systems (110). The ledger service (134) may be equipped to store immutable entries, where each entry includes a data and/or the metadata of the data. The ledger service may be internal or external to a local data system (112, 114) without departing from the invention. In scenarios in which the entries do not include the data (or where the data is otherwise not stored in the ledger service), the entries may include a reference to the data (e.g., a reference to a location in the object storage and/or a reference to a location in the local data system manager).

The ledger service may differ from the object storage (132) in that the ledger service (134) is equipped to implement security measures for the immutable entries. The security measures may include, for example, using private key decryption, peer validation (e.g., using third-party computing devices to validate the entries), etc. Other security measures may be implemented on the immutable entries of the ledger service (134) without departing from the invention.

The ledger service (134) may further differ from the object storage (132) by storing a limited amount of data. Said another way, each entry of the ledger service (134) may use less data than the object storage such that the total amount of data stored in the ledger service (134) is less than that of the object storage (132). For example, an entry of the ledger service (134) may store a hash value of the data stored in an entry of the object storage (132).

In one or more embodiments of the invention, the ledger service (134) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (134) described throughout this application.

In one or more embodiments of the invention, the ledger service (134) is implemented as a logical device. The logical device may utilize computing resources of any number of physical computing devices to provide the functionality of the ledger service (134) described throughout this application.

In one or more embodiments of the invention, the ledger service (134) is implemented as a distributed ledger (e.g., a block chain). The logical device may utilize computing resources of any number of physical computing devices to provide the functionality of the ledger service (134) described throughout this application.

Figure 1B:
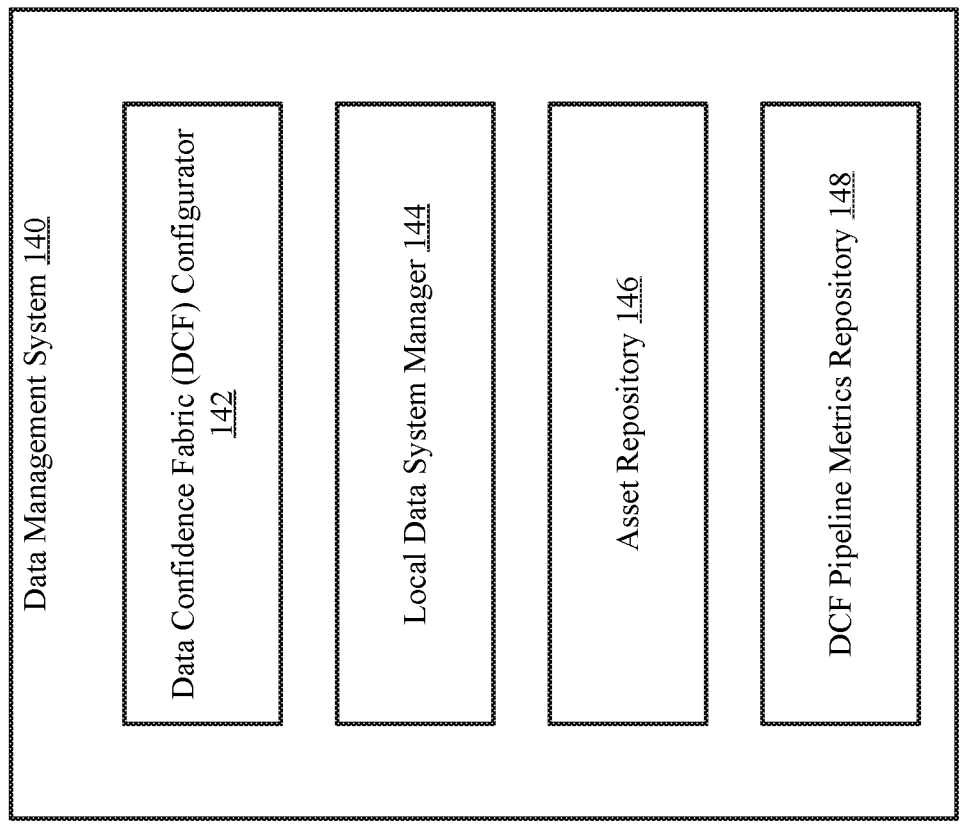
FIG. 1B shows a diagram of a data management system in accordance with one or more embodiments of the invention.

FIG. 1B shows a diagram of a data management system in accordance with one or more embodiments of the invention. The data management system (140) may be an embodiment of the data management system (100, FIG. 1A) discussed above. As discussed above, the data management system (140) communicates with clients to obtain a selection of configuration options and uses the selection to generate DCF configuration files to be deployed to one or more local data systems.

To perform the aforementioned functionality, the data management system (140) includes a data confidence fabric (DCF) configurator (142), a local data system manager (144), an asset repository (146), and a DCF pipeline metrics repository (148). The DCF configurator (142), a local data system manager (144), the asset repository (146), and the DCF pipeline metrics repository (148) may be operably connected via any combination of wired and/or wireless networks without departing from the invention. The data management system (140) may include additional, fewer, and/or different components without departing from the invention. Each of the aforementioned components is discussed below.

In one or more embodiments of the invention, the DCF configurator (142) communicates with the workloads to present options for configuring one or more local data systems. The options may be presented via a graphical user interface (GUI). The DCF configurator may send the options to a client (on which the workloads is executing) to be displayed by the GUI operating in the client.

In one or more embodiments of the invention, the options (also referred to as configuration options) specify configurations to be implemented on local data system managers of the local data systems. The configurations may specify options for augmenting unprocessed data and/or modifying the unprocessed data to generate processed data, options for storing the data (either processed data or unprocessed data) and/or options for isolating the generated data from other workloads. The configurations may be associated with a DCF pipeline in which the data is obtained and/or stored. In one or more embodiments of the invention, a DCF pipeline is a process (which may include multiple processing steps) to be performed by a local data system manager when obtaining and/or storing unprocessed data. The DCF pipeline is used to implement the sub-DCF within a DCF. Said another way, the DCF is partitioned (or divided) into sub-DCFs using DCF pipelines.

In one or more embodiments of the invention, the GUI may specify options for augmenting the unprocessed data. In one or more embodiments of the invention, the unprocessed data is augmented by generating additional data to be embedded in the unprocessed data prior to storage. The additional data may be, for example, metadata, digital signatures, identification information, etc.

In one or more embodiments of the invention, the metadata includes characteristics that may be useful to a computing device obtaining the data to determine a reliability of the data. The characteristics may include, for example, a data set identifier (e.g., a combination of letters, characters, and/or numbers that uniquely identify the processed or unprocessed data), a geographical location associated with the data, a type of data (e.g., temperature measurements, recorded video, speedometer data, etc.), a data source identifier (e.g., a combination of letters, characters, and/or numbers that uniquely identify a local data source from which the unprocessed data was obtained), etc. A workload may specify, e.g., using the GUI, which, if any, of the characteristics should be generated and/or embedded into (or otherwise associated with) the unprocessed data.

In one or more embodiments of the invention, the identification information specifies ownership of the data. The owner of the data may be a legal entity that has the right to store, obtain, use, and/or profit from the data. A legal entity may be a person, a group of people, a partnership, corporation, any other business entity, or any combination thereof. The workload may specify, e.g., using the GUI, whether the identification information should be generated and/or embedded into (or otherwise associated with) the unprocessed data. The identity of the owner may be specified using the DID for the owner.

In one or more embodiments of the invention, a digital signature of unprocessed data is data that is generated using a private key and the unprocessed data. The digital signature may be generated, for example, by performing a function (e.g., a hash function) on the unprocessed data to generate a value, and performing a secondary function (e.g., encryption) on the value using the private key. The workload may specify, e.g., using the GUI, whether a digital signature should be generated and/or embedded into (or otherwise associated with) the unprocessed data. The public-private key pair may be associated with the owner, where the data is signed using the private key of the owner of the data (also referred to as an object(s)).

In one or more embodiments of the invention, the GUI specifies options for modifying the unprocessed data. The data may be modified by, for example, performing an encryption and/or performing compression on the unprocessed or processed data prior to storing the data. In one or more embodiments of the invention, performing compression on unprocessed data includes applying a compression algorithm on the unprocessed data to generate processed data such that the processed data includes less data than the unprocessed data. The workload may specify, e.g., using the GUI, whether to modify the data prior to storage and/or the type of modification to perform (e.g., encryption, compression, etc.).

In one or more embodiments of the invention, the GUI specifies options for storing the data. The data may be stored internally in the local data system (e.g., in a persistent storage of the local data system manager) and/or externally. For example, the data (processed or unprocessed) may be replicated and stored in a ledger service. In such embodiments, the data (processed or unprocessed) may be stored by generating a ledger entry and storing the data and/or any metadata associated with the data in the ledger entry to be stored in the ledger service. The metadata associated with the data (processed or unprocessed) may further be stored in an object storage. The ledger entry may be used by, e.g., workloads for auditing purposes.

In one or more embodiments of the invention, the workload specifies, using the GUI, options for storing the processed or unprocessed data and/or any metadata associated with the processed or unprocessed data. The options may include storing the data in a ledger service and/or storing the metadata (if any) in an object storage.

In one or more embodiments of the invention, the GUI specifies options for isolating processed and/or unprocessed data. Specifically, the workload may specify that the processed and/or unprocessed data is to be stored in a location in the persistent storage that is not accessible to other workloads or in a persistent storage that is physically separate from the persistent storage used to stored process and/or unprocessed data associated with other workloads. Further, the workload may also specify that the processed and/or unprocessed data is to be transmitted to the persistent storage, the object storage, and/or to any other external storage location via its own communication channel (i.e., a communication channel that is not used to transmit processed and/or unprocessed data associated with any other workload). The isolated communicated channel may be implemented using, e.g., a virtual private network, or any other network (or communication) protocol that isolates network traffic. In addition, the unprocessed and/or processed data may be isolated from other workloads using, e.g., encryption. Other methods for isolating the processed and/or unprocessed data may be used without departing from the invention.

The invention is not limited to aforementioned options from which the user may select via a GUI. Moreover, while the options may be selected using a GUI, the options may be selected using any other selection mechanism (now or later discovered) without departing from the invention. For example, the options may be provided using a command line interface, an application programming interface(s) (API)(s), or any other mechanism for providing options to the workloads and/or for receiving the selections from the workloads.

In one or more embodiments of the invention, the DCF configurator (142) generates a DCF configuration file based on the selection of options obtained from the workload. For additional details regarding the generation of the DCF configuration file, see, e.g., FIG. 2A.

In one or more embodiments of the invention, DCF configurator (142) is a hardware device including circuitry. The DCF configurator (142) may be, for example, a digital signal processor, a field programmable gate array, or an application specific integrated circuit. The DCF configurator (142) may be other types of hardware devices without departing from the invention.

In one or more embodiments of the invention, the DCF configurator (142) is implemented as computing code stored on a persistent storage that when executed by a processor of the data management system (140) performs the functionality of the DCF configurator (142). The processor may be a hardware processor including circuitry such as, for example, a central processing unit or a microcontroller. The processor may be other types of hardware devices for processing digital information without departing from the invention.

In one or more embodiments of the invention, the local data system manager (144) interfaces with local data systems to configure one or more local data systems. Specifically, the local data system manager (144) deploys DCF configuration files generated by the DCF configurator (142). The local data system manager (152) may identify the local data system managers to which to send the DCF configuration files and subsequently send the DCF configuration files to the identified local data system managers.

In one or more embodiments of the invention, local data system manager (144) is a hardware device including circuitry. The local data system manager (144) may be, for example, a digital signal processor, a field programmable gate array, or an application specific integrated circuit. The local data system manager (144) may be other types of hardware devices without departing from the invention.

In one or more embodiments of the invention, the local data system manager (144) is implemented as computing code stored on a persistent storage that when executed by a processor of the data management system (140) performs the functionality of the local data system manager (144). The processor may be a hardware processor including circuitry such as, for example, a central processing unit or a microcontroller. The processor may be other types of hardware devices for processing digital information without departing from the invention.

In one or more embodiments of the invention, the asset repository (146) includes a number of asset entries. Each asset entry is associated with a local data source. The asset entry may include local data source metadata and terms. Each asset entry may include additional, fewer, and/or different data structures (or content) without departing from the invention.

In one or more embodiments of the invention, local data source metadata is a data structure that specifies information about the local data source. Information of a local data source may include, for example, a geographical location, type of the local data source (e.g., a type of sensor), metadata about the data obtained by the local data source, information about the local data system to which the local data source is connected. The local data source metadata may include other types of information without departing from the invention.

In one or more embodiments of the invention, the terms specify terms for accessing data obtained by the local data source. The terms may include, for example, a price and a time window for the access, and a type of access allowed.

The terms may also specify which workloads can access (or not access) the local data source. Depending on the implementation, if a given workload is not permitted to access a given local data source then the workload may also be prevented from knowing that the local data source exists. The determination of whether a given workload can access (or be made aware of a local data source) may be made by the data management system (or by an administrator(s) of the data management system and/or by another legal entity).

In one or more embodiments of the invention, the DCF pipeline metrics repository (148) includes a number of metrics entries. Each metrics entry is associated with a workload and, optionally, a DCF pipeline (described below). If the workload is only associated with a single DCF pipeline, then the metrics entry may be associated with the workload. However, if the workload is associated with multiple DCF pipelines, then the metrics entry is a per-workload per-DCF pipeline entry. The metrics entry may include metrics related to resource usage of a local data system by a workload over a period of time. Each metrics entry may include additional, fewer, and/or different data structures (or content) without departing from the invention.

In one or more embodiments of the invention, the metrics entry includes metrics information from different resources of the local data system. The metrics information may include, but is not limited to, processor usage, memory usage, network bandwidth usage (between the local data system and an object storage, ledger service, other computing device, etc.), amount of data processed within a period of time, type of data processed, etc. The metrics information may be obtained periodically from a logging service (described below) on a local data system. When the metrics information is received from the logging service, the logging service may specify the workload and/or DCF pipeline with which the metrics information is associated.

The asset repository (146) and the DCF pipeline repository (148) may each be implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the asset repository (146) and the DCF pipeline repository (148) described in this application.

The asset repository (146) and the DCF pipeline repository (148) may each be implemented as a logical device without departing from the invention. The logical device utilizes computing resources of any number of physical computing devices to provide the functionality of the data management system (100) described throughout this application.

Figure 1C:
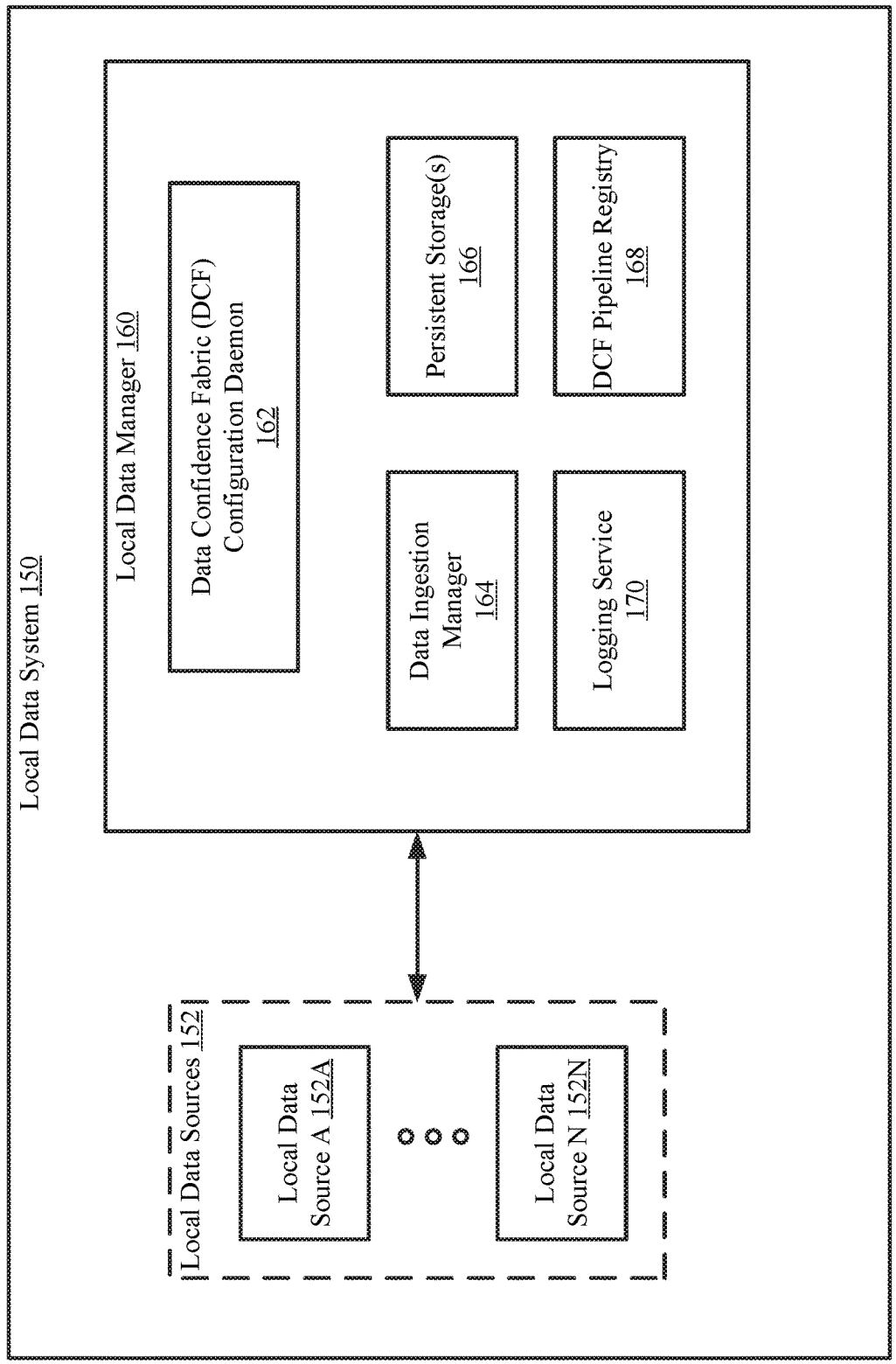
FIG. 1C shows a diagram of a local data system in accordance with one or more embodiments of the invention.

FIG. 1C shows a diagram of a local data system in accordance with one or more embodiments of the invention. The local data system (150) may be similar to a local data system (112, 114, FIG. 1A) discussed above. The local data system (150) may include local data sources (152) and a local data system manager (160). The local data system (150) may include additional, fewer, and/or different components without departing from the invention. Each component of the local data system (150) illustrated in FIG. 1C is discussed below.

In one or more embodiments of the invention, the local data sources (152) are sources of data obtained from real-world processes. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (152A, 152N) is an Internet-of-things (IOT) device. For example, one of the data sources (152A) may be a camera operably connected to the Internet and that supplies data via an IOT standard to the local data system manager (160). The data may be a video stream of a particular location. Image recognition may be utilized to extract relevant information from the video stream. The relevant information may be supplied to the local data system manager (160) in isolation or in combination with the video stream itself.

In one or more embodiments of the invention, the local data system manager (160) is a device (e.g., a computing device as shown in FIG. 5) that manages data obtained from the local data sources (152). The local data system manager (160) may manage the data by storing the data in internal storage (e.g., persistent storage (166)) or external storage and/or providing the data to external entities (e.g., workloads). The local data system manager (160) includes a DCF configuration daemon (162), a data ingestion manager (164), persistent storage (166), a DCF pipeline registry (168), and a logging service (170). The local data system manager may include additional, fewer, and/or different components without departing from the invention.

In one or more embodiments of the invention, the DCF configuration daemon (162) manages the configuration of components of the local data manger (160). Specifically, the DCF configuration daemon (162) configures the data ingestion manager (164) based on a DCF configuration file(s) obtained from a data management system. The DCF configuration daemon (162) may configure the data ingestion manager (164) in accordance with the method of FIG. 2B. The DCF configuration daemon may configure the data ingestion manager (164), or other components of the local data system manager (160), via other methods without departing from the invention.

In one or more embodiments of the invention, the DCF configuration daemon (162) is implemented as computing code stored on a persistent storage (e.g., 166) that when executed by a processor of the local data system manager (160) performs the functionality of the DCF configuration daemon (162). The processor may be a hardware processor including circuitry such as, for example, a central processing unit or a microcontroller. The processor may be other types of hardware devices for processing digital information without departing from the invention.

In one or more embodiments of the invention, the data ingestion manager (164) manages how unprocessed data is obtained (also referred to as ingested) from the local data sources (152). The data ingestion manager (164) may process the unprocessed data to generate processed data store the processed data in accordance with a DCF pipeline. The DCF pipeline may be specified by a DCF configuration file used by the DCF configuration daemon to configure the data ingestion manager (164). In one embodiment of the invention, the data ingestion manager (164) may have stored thereon or have access to the private key of the owner (as described above). The data ingestion manager (164) may use the private key to sign the data (or portions thereof) and/or encrypt the data.

In one embodiment of the invention, the local data manager (160) may receive multiple DCF configuration files. Each of these DCF configuration files may specify a DCF pipeline and, as such, be used to implement a sub-DCF. Thus, a single local data manager (160) may support multiple DCF pipelines and, as such, multiple sub-DCFs. Each DCF pipeline that is configured on the local data system may be registered in the DCF pipeline registry (168). The DCF pipeline registry (160) is a data structure that includes registry entries. Each registry entry may specify the following information: (i) a DCF pipeline identifier that identifies the DCF pipeline, (ii) information about the workload associated with the DCF pipeline, (iii) information specifying the processing required to be performed by the DCF pipeline and/or a reference to a location in the local data manager that includes the information specifying required to be performed by the DCF pipeline. The registry entry may be generated when the DCF configuration file is processed by the DCF configuration daemon (162).

The logging service (170) is configured to track resource usage of the resources in the local data system on a per-DCF pipeline basis. The logging system may include metrics entries. The metrics entries include metrics information from different resources of the local data system. The metrics information may include, but is not limited to, processor usage, memory usage, network bandwidth usage (between the local data system and an object storage, ledger service, other computing device, etc.), amount of data processed within a period of time, type of data processed, etc. The metrics entries may also specify the workload and/or DCF pipeline with which the metrics information is associated. The metrics entries may be periodically provided to (or obtained by) the data management service. The metrics entries may include additional and/or different information without departing from the invention.

The persistent storage (166) may be configured to store data. The persistent storage (166) may be a physical storage. For example, the persistent storage (166) may include hard disk drives, solid state drives, and/or tape drives for storing data. The persistent storage (166) may include other types of non-transitory storage mediums without departing from the invention.

In one or more embodiments of the invention, the persistent storage (166) stores data obtained from the local data sources (152). The data stored in the persistent storage (166) may be provided to workloads with which the data is associated, i.e., the workload associated with the DCF pipeline that processed and ultimately caused the data to be stored in the persistent storage.

FIGS. 2A-2C and 4 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C and 4 may be performed in parallel with any other steps shown in FIGS. 2A-2C and 4 without departing from the scope of the invention.

Figure 2A:
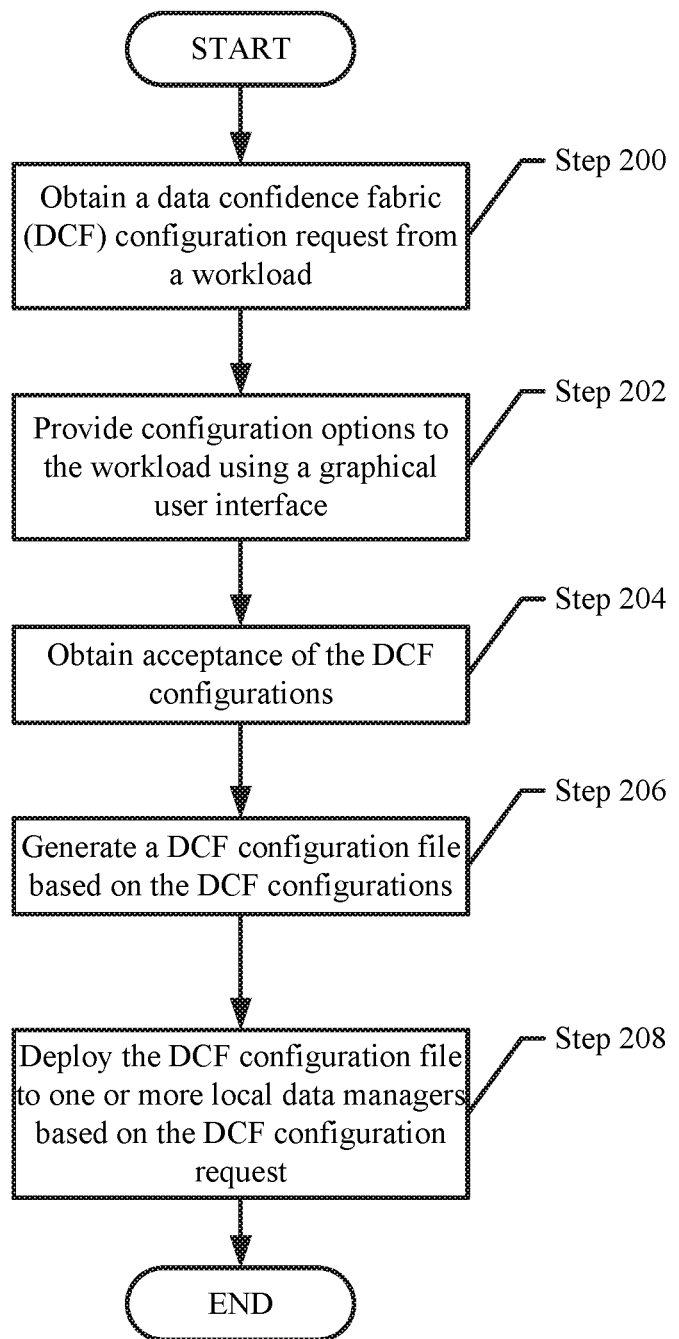
FIG. 2A shows a flowchart for managing a data confidence fabric (DCF) configuration in accordance with one or more embodiments of the invention.

FIG. 2A shows a flowchart for managing data confidence fabric configuration in accordance with one or more embodiments of the invention. The method shown in FIG. 2A may be performed by, for example, a data management system (100, FIG. 1A). Other components of the system illustrated in FIG. 1A may perform the method of FIG. 2A without departing from the invention.

Turning to FIG. 2A, in step 200, a DCF configuration request is obtained. In one or more embodiments of the invention, the DCF configuration request is obtained by a DCF configurator of the data management system. The DCF configuration request may specify a request to configure one or more local data systems. In one or more embodiments of the invention, the DCF configuration request is obtained from a workload. The DCF configuration request may specify the type of data to be processed (e.g., traffic data, temperature data, audio, etc.). Alternatively, the DCF configuration request may specify one or more local data systems.

As discussed above, a given workload may not be able to access a local data system and/or specific data obtained by a local data source. In one or more embodiments of the invention, the workload may initially query the asset repository to obtain a listing of available local data sources. In this scenario, the data management system may only include local data sources that the workload may access in response to such a query. The workload may then send a DCF configuration request specifying one (or more) local data sources of the aforementioned local data sources. However, in other scenarios, the workload may be aware of all local data sources (or at least some local data sources that it is not permitted to access). In this scenario, the workload may submit a request for a local data source, which may be a local data source that is may not access.

Upon receipt of the DCF configuration request, the DCF configurator may determine the workload has access to the local data source specified in the DCF configuration request using, e.g., the asset repository. If the workload does not have access to the local data source, then the process ends. Otherwise, the process proceeds to step 202.

In step 202, configuration options are provided to the workload using a graphical user interface. In one or more embodiments of the invention, the DCF configuration options specify the options for configuring the local data systems. The options may be for augmenting the data, modifying the data, and/or storing the data. The DCF configuration options may be sent by the DCF configurator.

In one or more embodiments of the invention, the workload (or a user using the workload) makes a selection of the options using the GUI. The selection of the options may include all or a portion of the options provided by the data management system. The options may be displayed using categories based on the types of options for configuration. For example, a first category may be "Device Data" that displays options for configuring the type of data to be processed during data ingestion. A second category may be, for example, "Provenance Data" that displays options for configuring the generation of metadata associated with ingested data. This may also include signing the objects using a private key of the owner. A third category may be, for example, "Identity" that displays options for configuring the identification information of the obtained data. Additional categories may be displayed for additional options without departing from the invention.

In one embodiment of the invention, the GUI is provided to the client in response to the DCF configuration. In other words, the GUI is sent to the client to be used when selecting from the configuration options.

In one embodiment of the invention, access to the GUI is provided to the workload. For example, a link (e.g., a hyperlink) to the GUI is sent to the workload, and the GUI may be accessed by the workload from the data management system.

Alternatively, the configuration options may be provided to the workload using a non-graphical user interface such as, for example, a command line interface (CLI), application programming interfaces (APIs), or a hypertext transfer protocol (HTTP) interface. The workload may communicate the selection using the corresponding non-graphical user interface.

In step 204, acceptance of the DCF configurations is obtained. In one or more embodiments of the invention, the acceptance includes the selection of the configuration options.

In step 206, a DCF configuration file is generated based on the DCF configurations. In one or more embodiments of the invention, the DCF configuration file is generated by obtaining a data structure that specifies the selection of options in a format that is readable by a DCF configuration daemon. The DCF configuration file may specify a DCF pipeline that specifies a process for modifying, augmenting, isolating, and/or storing data based on the selection of configuration options. The DCF configuration file may also specify the workload that specified the DCF configurations. The DCF configuration file may be generated by the DCF configurator.

In step 208, the DCF configuration file is deployed to one or more local data system managers based on the DCF configuration request. In one or more embodiments of the invention, the DCF configuration file is deployed using a push deployment mechanism that includes sending the configuration file as a virtual container to one or more local data system managers. The local data system managers may be specified in the DCF configuration file. Alternatively, the DCF configuration file may specify a type of data, and the DCF configurator may identify one or more local data system managers that obtain the type of data. The DCF configuration file may then be sent to the identified local data system managers.

In one or more embodiments of the invention, the DCF configuration file is deployed using a decentralized deployment mechanism. The decentralized deployment mechanism may include generating a configuration file identifier associated with the DCF configuration file and providing the configuration file identifier, along with a minimum set of information that may be used by the local data system managers to determine whether (or not) to request the DCF, to all (or a portion) of the local data management systems. Each local data system manager may determine whether to obtain the DCF configuration file from the data management system in response to receiving the configuration file identifier (and the aforementioned accompanying information). If a local data system manager determines that if should obtain the DCF, the local data may send a request that specifies the confirmation file identifier to the data management system. The data management system subsequently sends the DCF configuration file to the local data system manager.

Figure 2B:
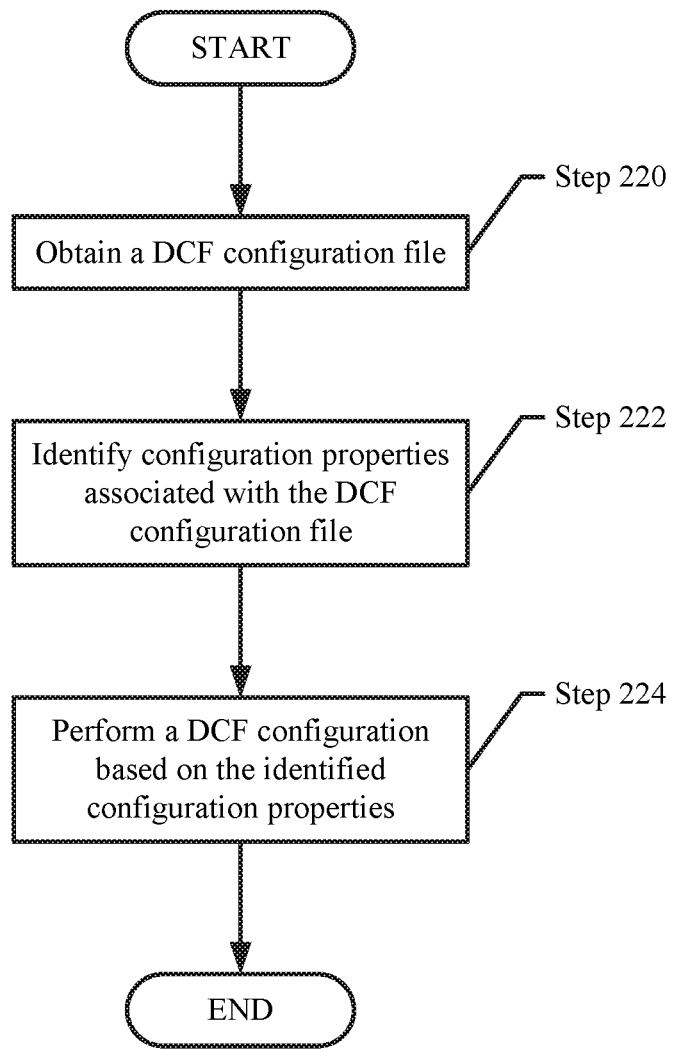
FIG. 2B shows a flowchart for configuring a local data system manager in accordance with one or more embodiments of the invention.

FIG. 2B shows a flowchart for configuring a local data system manager in accordance with one or more embodiments of the invention. The method shown in FIG. 2B may be performed by, for example, a local data system manager (160, FIG. 1C). Other components of the system illustrated in FIG. 1A or FIG. 1C may perform the method of FIG. 2B without departing from the invention.

In step 220, a DCF configuration file is obtained. In one or more embodiments of the invention, the DCF configuration file is obtained based on the deployment mechanism of the data management system (as described above).

In step 222, configuration properties associated with the DCF configuration file are identified. The configuration properties may be identified using a DCF configuration daemon of the local data system manager. In one or more embodiments of the invention, the configuration properties include each configuration options specified in the DCF configuration file. The DCF configuration daemon may analyze the DCF configuration file and identify each configuration property.

In one or more embodiments of the invention, each configuration property specifies a configuration for augmenting, modifying, isolating, and/or storing data obtained from one or more local data sources. The configuration property may specify the local data source and/or the type of data for which the local data system manager is to process the data.

In step 224, a DCF configuration is performed based on the identified configuration properties. In one or more embodiments of the invention, the configuration is performed by selecting an identified configuration property and configuring a data ingestion manager to perform a process in accordance with the configuration property. For example, a configuration property may specify a digital signature to be generated for incoming traffic data. The DCF configuration daemon may configure the data ingestion manager to determine whether incoming data is traffic data and, if the incoming data is traffic data, to generate a signature of the incoming data. The process may be repeated for all identified configuration properties.

In one or more embodiments of the invention, the configuration is performed by generating a DCF pipeline based on the configuration properties. The DCF pipeline may be a process for processing incoming data in accordance with the configuration properties. The DCF pipeline may be associated with a type of data and/or a local data source. The DCF pipeline may be registered in the DCF pipeline registry. The DCF configuration daemon may subsequently configure the data ingestion manager to perform the DCF pipeline for associated data sets and/or associated local data sources.

Figure 2C:
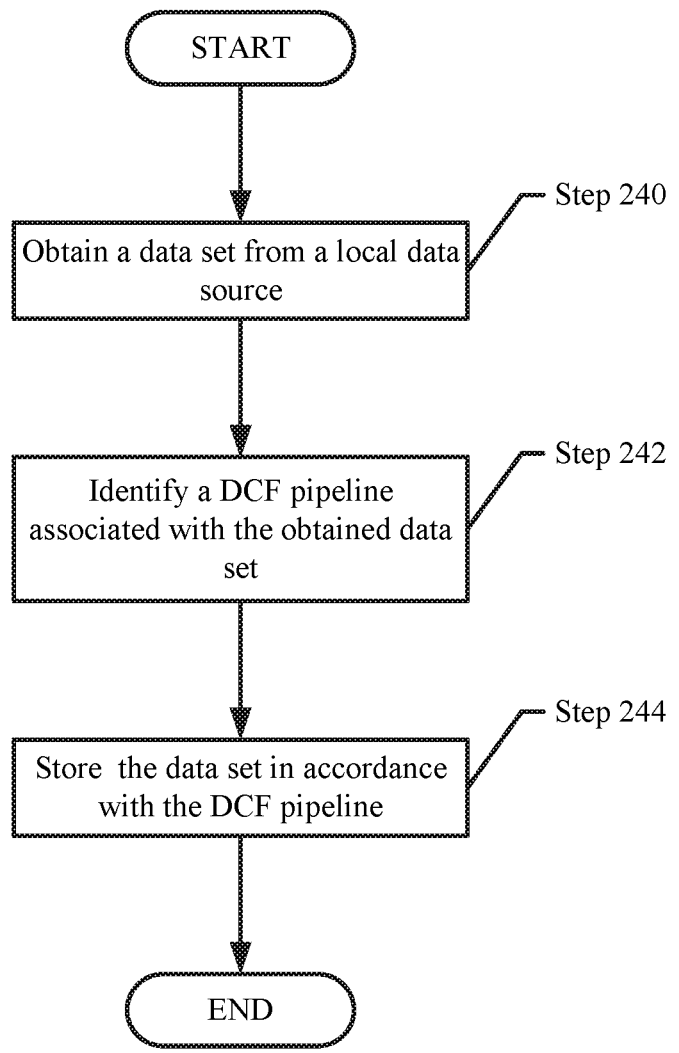
FIG. 2C shows a flowchart for performing data processing in accordance with one or more embodiments of the invention.

FIG. 2C shows a flowchart for performing data processing in accordance with one or more embodiments of the invention. The method shown in FIG. 2C may be performed by, for example, a local data system manager (160, FIG. 1C). Other components of the system illustrated in FIG. 1A or FIG. 1C may perform the method of FIG. 2C without departing from the invention.

In step 240, a data set (or data) is obtained from a local data source. The data set may be obtained by a data ingestion manager of the local data system manager.

In step 242, a DCF pipeline that is identified is associated with the obtained data set. In one or more embodiments of the invention, the data ingestion manager may identify a type of data of the data set, the source of the data set (e.g., the local data source), and/or any other characteristics of the data set, and, using the aforementioned characteristics, identify a DCF pipeline that is associated with the data set from the set of DCF pipelines in the DCF pipeline registry. For example, if the obtained data set is an audio recording, the data ingestion manager may identify a DCF pipeline associated with audio data. In another example, the data set may be for a specific local data source (e.g., data obtained from a specific IoT device). In this scenario, the DCF pipeline for the specific IoT device is selected.

In step 244, the data set is processed and/or stored in accordance with the DCF pipeline(s). In one or more embodiments of the invention, the DCF pipeline performs the DCF pipeline to store the obtained data set. The data ingestion manager may perform the process of the DCF pipeline in the specified order. In one or more embodiments of the invention, the process includes augmenting the data, modifying the data, isolating, and/or storing the data. The data ingestion manager may augment the data, modify the data, performs actions to isolate the data (creating a separate communication channel over which to transmit the data, encrypting the data, etc.) and/or store the data in accordance with the DCF pipeline. The local data manager (and/or the data ingestion manager) may track the resource usage of the local data system while the data is being processed using the DCF pipeline. Once the processing is complete, the resource usage information may be provided to the logging service such that the logging service may store a corresponding metrics entry.

The method shown in FIG. 2C may be performed each time a data set is received. Moreover, if multiple DCF pipelines are associated with the data set (as specified in the DCF pipeline registry), the method shown in FIG. 2C may be performed multiple times on the same data set with different DCF pipelines.

Example

Figure 3A:
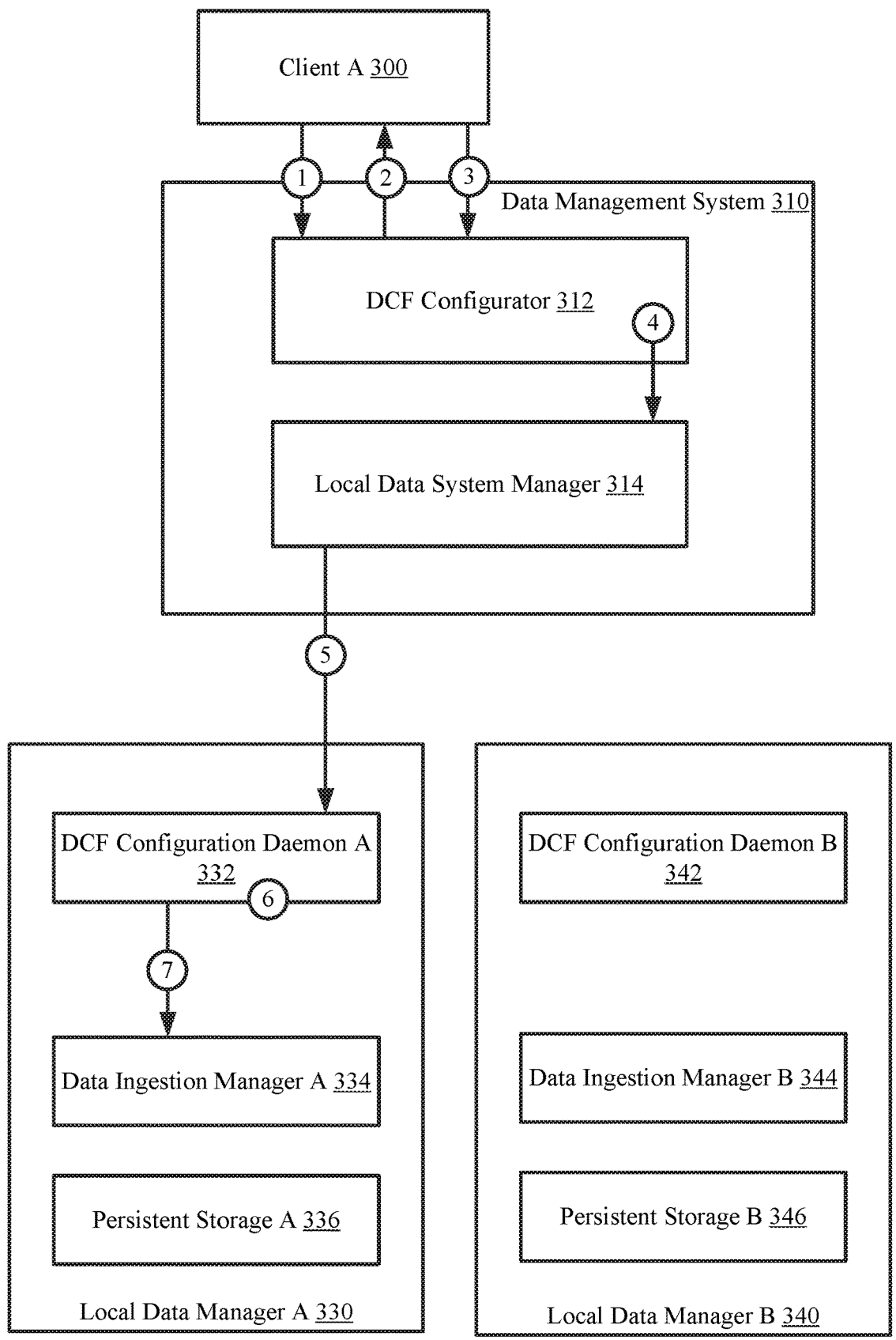
FIGS. 3A-3C show an example in accordance with one or more embodiments of the invention.
Figure 3B:
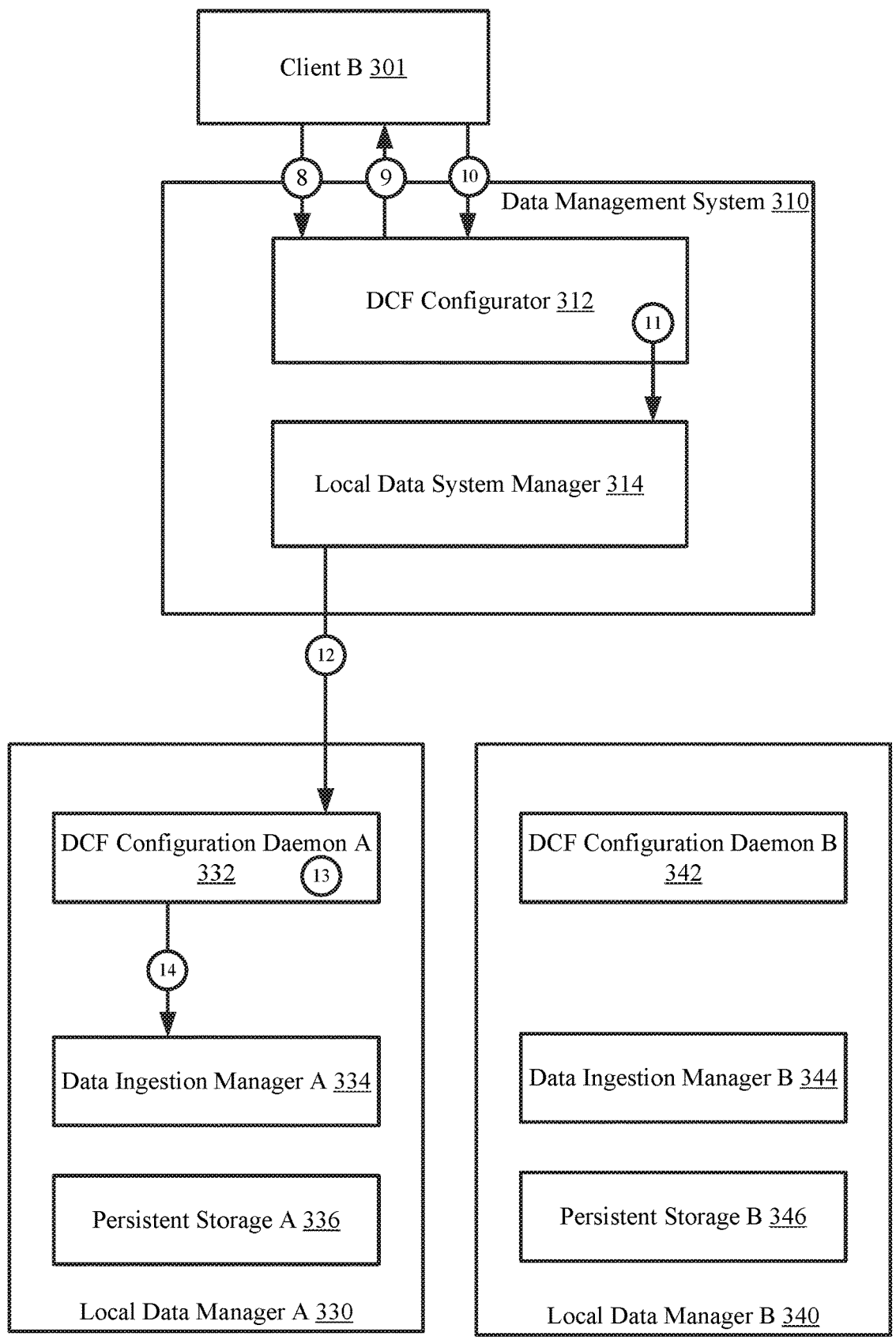
Figure 3C:
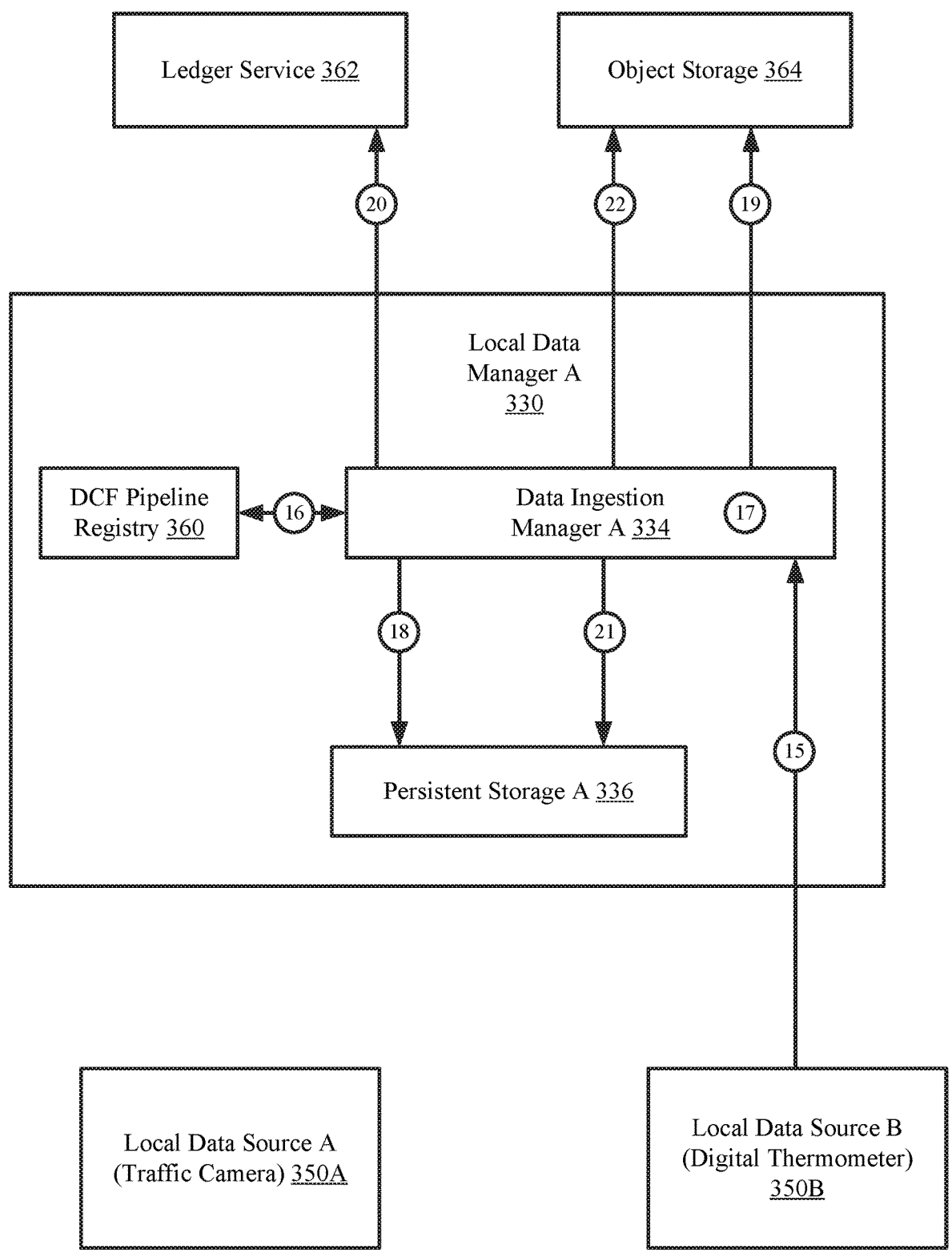

The following section describes an example. The example, illustrated in FIGS. 3A-3C, is not intended to limit the invention. Turning to the example, consider a scenario in which workloads would like to configure a data confidence fabric (DCF) to store data reliably.

FIG. 3A shows an example system in accordance with one or more embodiments of the invention. The system includes a workload A (300) communicating with a data management system (310). Workload A sends a request to the data management system (310) to configure local data system manager A to obtain the data [1]. The data management system (310) uses a DCF configurator (312) to provide configuration options to the workload A (300) [2]. The configuration options specify options for augmenting, modifying, isolating, and/or storing data obtained by the local data system manager A (330). The workload A (300) makes a selection of options that include the following options: (i) an option to generate a digital signature of all digital thermometer data obtained by the local data system manager (330) using a private key of workload A, (ii) an option to generate geographic information that specifies a location of local data source B (305, FIG. 3C), (iii) an option to store the digital thermometer data in an object storage and in persistent storage of the local data system in an encrypted form, and (iv) an option to store the digital thermometer data in a ledger service. The workload A (300) provides the selection to the DCF configurator (312) [3].

The DCF configurator (312) uses the selection of options to generate a DCF configuration file [4]. The DCF configuration file specifies a DCF pipeline ("DCF Pipeline A") that is to be performed by specified local data system manager (330). The DCF pipeline specifies the following process: (i) generate a digital signature of the digital thermometer data using a private key of the owner of the digital thermometer data, (ii) obtain geographic information of the obtained data, (iii) store the digital thermometer data in an object storage in an encrypted form, (iv) store the obtained digital thermometer data in persistent storage of the local data system manager in an encrypted form; and (v) generate and store the an identifier of the data set in a ledger service.

After the DCF configuration file is generated, a local data system manager (314) of the data management system (310) deploys the DCF configuration file to the specified local data system manager (330) [5]. Specifically, the local data system manager (314) uses a deployment mechanism that includes sending the DCF configuration file to the specified local data system manager (330).

A DCF configuration daemon (332) of the local data system manager (330) obtains the DCF configuration file and identifies the DCF properties [6]. Specifically, the DCF configuration daemon (332) generates a DCF pipeline to be performed by the data ingestion manager (334). The DCF configuration daemon (332) configures the data ingestion manager (334) to perform the DCF pipeline for any ingested digital thermometer data [7]. The DCF pipeline—i.e., DCF Pipeline A—is also registered in the DCF pipeline registry (360, FIG. 3C).

FIG. 3B shows a diagram of the system at a later point in time. Workload B (301) sends a request to the data management system (310) to configure local data system manager A that obtain the data [8]. The data management system (310) uses a DCF configurator (312) to provide configuration options to the workload B (301) [8]. The configuration options specify options for augmenting, modifying, isolating and/or storing data obtained by the local data system manager A (330). The workload B (301) makes a selection of options that include the following options: (i) an option to generate a digital signature of all digital thermometer data obtained by the local data system manager (330) using a private key of workload B, and (ii) an option to store the digital thermometer data in an object storage and in persistent storage of the local data system in an encrypted form. The workload B (301) provides the selection to the DCF configurator (312) [10].

The DCF configurator (312) uses the selection of options to generate a DCF configuration file [11]. The DCF configuration file specifies a DCF pipeline ("DCF Pipeline B") that is to be performed by specified local data system manager (330). The DCF pipeline specifies the following process: (i) generate a digital signature of the digital thermometer data using a private key of the owner of the digital thermometer data, (ii) store the digital thermometer data in an object storage in an encrypted form, and (iii) the store digital thermometer data (also referred to as objects) in persistent storage of the local data system manager in an encrypted form.

After the DCF configuration file is generated, a local data system manager (314) of the data management system (310) deploys the DCF configuration file to the specified local data system manager (330) [12]. Specifically, the local data system manager (314) uses a deployment mechanism that includes sending the DCF configuration file to the specified local data system manager (330).

A DCF configuration daemon (332) of the local data system manager (330) obtains the DCF configuration file and identifies the DCF properties [13]. Specifically, the DCF configuration daemon (332) generates the DCF pipeline to be performed by the data ingestion manager (334). The DCF configuration daemon (332) configures the data ingestion manager (334) to perform the DCF pipeline for any ingested digital thermometer data [14]. The DCF pipeline—i.e., DCF Pipeline B—is also registered in the DCF pipeline registry (360, FIG. 3C).

FIG. 3C shows a diagram of the system at a later point in time. The system shows local data system manager A (330) obtaining a first data set from local data source B (350B) [15]. The data set is temperature readings. The data ingest manager (334) determines the DCF pipelines that have been registered that are to be used to process the data [16]. Data ingestion manager A (334) subsequently processes the data in accordance with a DCF pipelines A and B [17]. Specifically, in this example and in accordance with DCF pipeline A, the data ingest manager (334) generates geographic information associated with the temperature readings (i.e., metadata) and associates this information with the data set. The data and metadata are then signed and encrypted using the private key of workload A to obtain processed data. The processed data is stored in persistent storage (336) of the local data system manager (330) [18]. In addition, as specified by DCF pipeline A, the processed data is stored in the object storage (364) [19] and an identifier associated with the data set is stored in the ledger service (362) [20].

With respect to DCF pipeline B, the data ingest manager (334) encrypts that data set using the private key of workload B to obtain processed data. The processed data is stored in persistent storage (336) of the local data system manager (330) [21]. In addition, as specified by DCF pipeline A, the processed data is stored in the object storage (364) [22].

End of Example

One or more embodiments of the invention enable any workload (subject to the restrictions discussed above) to have a DCF pipeline execute on a local data system. As a result, the resources of a given local data system may become overwhelmed and, as such, actions may be need to be taken to mitigate this issue and/or to take actions when such scenarios occurs.

FIG. 4 shows a flowchart for managing a DCF in accordance with one or more embodiments of the invention. The method shown in FIG. 4 may be used to mitigate and/or react to scenarios in which the local data system resources become overwhelmed. The method shown in FIG. 4 may be performed by, for example, the data management service (100, FIG. 1A). Other components of the system illustrated in FIG. 1A may perform the method of FIG. 4 without departing from the invention.

In step 400, an unprocessed workload is selected. A workload is determined to be an unprocessed workload when metrics entries in the DCF pipeline metrics repository associated with the workload have not been processed.

In step 402, one or more metrics entries from the DCF pipeline metrics repository associated with the workload are obtained. The metrics entries may include all metrics entries associated with the workload or only a subset of metrics entries associated with the workload, e.g., metrics entries for a specific time period.

In step 404, the obtained metrics entries are analyzed to determine an amount of data that has been processed by the DCF pipeline(s) associated with the workload. The amount of data that has been processed may include data that has been processed using the DCF pipeline associated with the workload.

In step 406, the obtained metrics entries are analyzed to determine the frequency at which the DCF pipeline is used to process data. For example, if the local data source provides a data set once a day, then the frequency of processing by the DCF pipeline may be once per day (or once per 24 hours). The invention is not limited to the aforementioned examples.

In step 408, the obtained metrics entries are analyzed to determine the type of data that has been processed by the DCF pipeline(s) associated with the workload. The type of data is information about what the data represents in the real world—e.g., temperature data, traffic camera data, etc. The type of data may be explicitly specified in the metrics entries. Alternatively, the local data source may be specified within the metrics entries, e.g., the metrics entries may include information about the specific sensor that was used to obtain the data. In this scenario, the information about the local data source may be used to infer or determine the type of data. This type of data that is determined in step 408 may be verified by a user (e.g., an administrator).

In step 410, the obtained metrics entries are analyzed to determine the resources used the DCF pipeline(s) associated with the workload when processing data. For example, if the DCF pipeline requires the data to be encrypted, then the resource usage may reflect the processor usage and memory usage of the local data system that is required to perform the encryption.

The information determined in steps 402-410 for the workload is then used to perform the workload ranking in step 414.

In step 412, a determination is made about whether all of the workloads have been processed. The determination may be made on a per-local data system basis and/or on a global basis. For example, depending on the scope of the workload ranking, only the workloads associated with a given local data system (i.e., workloads that have registered DCF pipelines in the local data system) may be considered in order to determine the workload ranking.

If there are additional workloads to process, the method proceeds to step 400; otherwise, the method proceeds to step 414.

In step 414, the information obtained in steps 402-410 for each of the workloads is used to determine a workload ranking. The workload ranking is a relative ranking of workloads on the local data system(s). In order to determine the workload ranking, the information obtained in steps 402-410 may be weighted such that some information, e.g., type of data, may be considered more important when determining the workload ranking as compared with other information. The invention is not limited to any specific mechanism for determining the workload ranking using the information obtained in step 402-410.

In one embodiment of the invention, the workload ranking may be verified by one or more users (e.g., administrators). Specifically, the administrators may receive the workload ranking generated in step 414 and provide feedback with respect to whether they agree with the workload ranking and/or if they propose any modifications to the workload ranking. The feedback on the workload rankings (also referred to as verification votes) may be used to immediately modify the ranking (i.e., prior to proceeding to step 416) and/or it may be used to update how the workload rankings are generated, e.g., it may be used to modify the weights applying to the information obtained in steps 402-410.

In step 416, once the workload ranking has been determined, the data management system may perform an action set based on the workload ranking. The action set may include one or more actions that may be performed by the data management system based on the workload rankings. The following is a non-limiting list of action sets: (i) the data management system instructs a local data system to stop future executions of one or more DCF pipelines; (ii) the data management system instructs a local data system to temporarily stop execution of one or more DCF pipelines for a defined period of time; (iii) the data management system instructs a local data system to temporarily stop executions of one or more DCF pipelines when one or more resource usage thresholds on the local data system are reached, e.g., DCF pipeline A is not to be executed when the processor usage of the local data system is above 70%. The resource usage thresholds for the local data system may be provided by the data management system or by another entity in the system without departing from the invention.

The method shown in FIG. 4 may be periodically performed in order to dynamically manage the resource usage of the local data systems. By performing the method shown in FIG. 4, the local data systems may prioritize the execution of certain DCF pipelines over other DCF pipelines. The prioritization may be based on the relative importance of the data being processed by the DCF pipeline. Additionally, or alternatively, if the data management system has agreed to a certain level of service (e.g., via a service level agreement (SLA)) for a given DCF pipeline associated with a given workload, then the data management system may throttle (or otherwise limit) the processing of other DCF pipelines on the local data system in order to ensure that the processing of the DCF pipeline by the local data system satisfies the SLA. The invention is not limited to the aforementioned example.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of providing data to a client from, e.g., IoT by managing a data confidence fabric between the client and the internet of things devices. The data confidence fabric is managed by configuring devices that obtain the data to perform specified processes, at the time of ingest, to the data that increase the reliability in using the data. The processed may increase the reliability of the data by augmenting the data to include additional information that may further specify where the data comes from and/or how the data was obtained. In this manner, the client may rely on the additional information to determine a confidence in using the data for application purposes.

Further, embodiments of the invention allow options for modifying the obtained data such that security measures are implemented on the obtained data, further increasing the reliability of the data. In this manner, the client may rely on the modifications to determine that the data has not been undesirably tampered with (or otherwise modified), thus further increasing the reliability of the data.

Further, embodiments of the invention enable the data to be processed using different DCF pipelines such that different workloads can request different types of processing on the same data. When a given local data system implements multiple DCF pipelines, the local data system may be optimized with respect to the processing of the DCF pipelines. In this manner, a given local data system may include an arbitrarily large number of DCF pipelines and at the same time dynamically manage (with assistance from the data management system) the processing of the DCF pipelines.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   obtaining, by a data management system, a first resource usage of a local data system associated with a first data confidence fabric (DCF) pipeline, wherein the first DCF pipeline is associated with a first workload;
   obtaining second resource usage of the local data system associated with a second DCF pipeline, wherein the second DCF pipeline is associated with a second workload;
   analyzing the first resource usage and the second resource usage to obtain a workload ranking; and
   performing an action set based on the workload ranking.

2. The method of claim 1, further comprising:
   generating a DCF configuration file for the first DCF pipeline; and
   deploying the DCF configuration file to the local data system.

3. The method of claim 1, further comprising:
   prior to performing the action set:
   validating the workload ranking using verification votes obtained from an external computing device.

4. The method of claim 1,
   wherein the first workload is executing on one selected from a group consisting of a client, the local data system, and a second local data system,
   wherein the local data system and the second local data system are managed by the data management system.

5. The method of claim 1, wherein analyzing the first resource usage and the second resource usage comprises:
   determining an amount of data processed by the first DCF pipeline; and
   determining a frequency at which the first DCF pipeline is executed.

6. The method of claim 5, wherein analyzing the first resource usage and the second resource usage further comprises:
   determining a type of data processed by the first DCF pipeline.

7. The method of claim 1, wherein analyzing the first resource usage and the second resource usage comprises:
   determining an amount of data that the first DCF pipeline transmits to an external computing device for processing.

8. The method of claim 1, performing the action set comprises:
   temporarily preventing data from being processed by the first DCF pipeline.

9. The method of claim 1, performing the action set comprises:
   preventing data from being processed by the first DCF pipeline when resource availability on the local data system is less than a threshold value.

10. A non-transitory computer readable medium comprising computer readable program code, which when executed by a computer processor enables the computer processor to perform a method, the method comprising:
    obtaining, by a data management system, a first resource usage of a local data system associated with a first data confidence fabric (DCF) pipeline, wherein the first DCF pipeline is associated with a first workload;
    obtaining second resource usage of the local data system associated with a second DCF pipeline, wherein the second DCF pipeline is associated with a second workload;
    analyzing the first resource usage and the second resource usage to obtain a workload ranking; and
    performing an action set based on the workload ranking.

11. The non-transitory computer readable medium of claim 10, the method further comprising:
    generating a DCF configuration file for the first DCF pipeline; and deploying the DCF configuration file to the local data system.

12. The non-transitory computer readable medium of claim 10, the method further comprising:
   prior to performing the action set:
   validating the workload ranking using verification votes obtained from an external computing device.

13. The non-transitory computer readable medium of claim 10,
   wherein the first workload is executing on one selected from a group consisting of a client, the local data system, and a second local data system,
   wherein the local data system and the second local data system are managed by the data management system.

14. The non-transitory computer readable medium of claim 10, wherein analyzing the first resource usage and the second resource usage comprises:
   determining an amount of data processed by the first DCF pipeline; and
   determining a frequency at which the first DCF pipeline is executed.

15. The non-transitory computer readable medium of claim 14, wherein analyzing the first resource usage and the second resource usage further comprises:
   determining a type of data processed by the first DCF pipeline.

16. The non-transitory computer readable medium of claim 10, wherein analyzing the first resource usage and the second resource usage comprises:
   determining an amount of data that the first DCF pipeline transmits to an external computing device for processing.

17. The non-transitory computer readable medium of claim 10, performing the action set comprises: temporarily preventing data from being processed by the first DCF pipeline.

18. The non-transitory computer readable medium of claim 10, performing the action set comprises:
   preventing data from being processed by the first DCF pipeline when resource availability on the local data system is less than a threshold value.

19. A system, comprising:
   a processor;
   memory comprising instructions, which when executed by the processor, perform a method, the method comprising:
      obtaining first resource usage of a local data system associated with a first data confidence fabric (DCF) pipeline, wherein the first DCF pipeline is associated with a first workload;
      obtaining second resource usage of the local data system associated with a second DCF pipeline, wherein the second DCF pipeline is associated with a second workload;
      analyzing the first resource usage and the second resource usage to obtain a workload ranking; and
      performing an action set based on the workload ranking.

20. The system of claim 19, wherein the method further comprises:
   prior to obtaining the first resource usage and the second resource usage generating a DCF configuration file for the first DCF pipeline, deploying the DCF configuration file to the local data system, and
   prior to performing the action set, validating the workload ranking using verification votes obtained from an external computing device.

* * * * *